(12) United States Patent
Chen (10) Patent No.: US 11,476,657 B2
(45) Date of Patent: Oct. 18, 2022

(54) DC POWER ATTACHMENT DEVICE

(71) Applicant: Entrantech Inc., Gilroy, CA (US)

(72) Inventor: Kong-Chen Chen, Gilroy, CA (US)

(73) Assignee: Entrantech Inc., Gilroy, CA (US)

( * ) Notice: Subject to any disclaimer, the term of this patent is extended or adjusted under 35 U.S.C. 154(b) by 0 days.

(21) Appl. No.: 16/950,882

(22) Filed: Nov. 17, 2020

(65) Prior Publication Data

US 2022/0014014 A1 Jan. 13, 2022

Related U.S. Application Data

(60) Provisional application No. 63/065,341, filed on Aug. 13, 2020, provisional application No. 63/050,098, filed on Jul. 9, 2020.

(51) Int. Cl.
| | |
|---|---|
| *H02H 7/12* | (2006.01) |
| *H02H 1/00* | (2006.01) |
| *H01R 31/06* | (2006.01) |
| *H02M 3/155* | (2006.01) |
| *H02M 7/00* | (2006.01) |

(52) U.S. Cl.
CPC ......... *H02H 7/1213* (2013.01); *H01R 31/065* (2013.01); *H02H 1/0007* (2013.01); *H02M 3/155* (2013.01); *H02M 7/003* (2013.01)

(58) Field of Classification Search
CPC .... H02H 7/003; H02H 7/1213; H02H 1/0007; H01R 31/065; H02M 3/155
USPC ....................................................... 361/91.5
See application file for complete search history.

(56) References Cited

U.S. PATENT DOCUMENTS

| | | | |
|---|---|---|---|
| 5,786,642 A | 7/1998 | Wilhelm | |
| 6,320,359 B1 | 11/2001 | Nagaya et al. | |
| 6,798,666 B1 | 9/2004 | Alexander et al. | |
| 11,183,851 B1 | 11/2021 | Chen | |
| 2004/0085043 A1 | 5/2004 | Germagian et al. | |
| 2005/0225955 A1 | 10/2005 | Grebenkemper et al. | |
| 2005/0237724 A1* | 10/2005 | Fiorentino | G06F 1/189 |
| | | | 361/752 |
| 2006/0244620 A1 | 11/2006 | Sotiriou | |
| 2011/0053394 A1 | 3/2011 | Hood, III et al. | |
| 2012/0118602 A1 | 5/2012 | Remmert | |
| 2013/0015714 A1* | 1/2013 | Kwok | H02J 1/10 |
| | | | 307/75 |
| 2015/0348733 A1 | 12/2015 | Yu et al. | |
| 2018/0212420 A1* | 7/2018 | Chen | H02H 7/22 |
| 2022/0052618 A1 | 2/2022 | Chen | |

(Continued)

OTHER PUBLICATIONS

U.S. Notice of Allowance dated Jul. 27, 2021 in U.S. Appl. No. 17/062,413.

(Continued)

*Primary Examiner* — Yemane Mehari
(74) *Attorney, Agent, or Firm* — Weaver Austin Villeneuve & Sampson LLP (57) ABSTRACT

A DC power attachment device provides a convenient solution in adapting DC powers from AC sockets connected to an existing power distribution circuit. It enables multitude DC devices to concurrently access multiple DC powers at the same or at different voltages on the same power attachment device, which may be coupled to a DC power source, an existing socket, or directly connected to a DC power distribution circuit. The method on the assembly of a DC power attachment device is also addressed.

25 Claims, 9 Drawing Sheets

(56) References Cited

U.S. PATENT DOCUMENTS

2022/0052619 A1    2/2022   Chen
2022/0158482 A1    5/2022   Chen

OTHER PUBLICATIONS

ISR & WO dated May 3, 2022 (ISA/US) in PCT Application No. PCT/US2021/059792.
U.S. Appl. No. 17/667,457, filed Feb. 8, 2022, Chen.
U.S. Appl. No. 17/402,450, inventor Chen K.C., filed Aug. 13, 2021.
U.S. Corrected Notice of Allowance dated Jul. 18, 2022 in U.S. Appl. No. 17/398,355.
U.S. Non-Final office Action dated Aug. 24, 2022 in U.S. Appl. No. 17/402,435.
U.S. Notice of Allowance dated Jul. 7, 2022 in U.S. Appl. No. 17/398,355.

* cited by examiner

DC POWER ATTACHMENT DEVICE

CROSS REFERENCE TO RELATED APPLICATIONS

The present application claims benefit under 35 USC 119(e) of Application Ser. No. 63/050,098, filed on Jul. 9, 2020, and Application Ser. No. 63/065,341, filed on Aug. 13, 2020, the contents of which are incorporated herein by reference in their entirety.

FIELD OF THE INVENTION

The present invention relates to AC and DC voltage supplies, and more particularly, to the adaptation of DC power from a DC power distribution circuit.

BACKGROUND

AC power is widely used at homes, offices, commercial and public areas, and the like. Most electronic devices, however, contain integrated circuits (IC), which require DC power to operate. To convert power into DC voltage to power electronic devices or to charge a battery, a power adaptor is used.

Power adapters, however, are cumbersome, inconvenient to carry, and often incompatible from product to product, and company to company. Therefore, a user may carry multiple adapters, one for each electronic the user has. In addition, most electronic products often come with their own power adapters. When a new electronic product is commercialized, the older generation adapter is often discarded, resulting in excessive e-waste and adverse impact to the environment. Power adapters that convert AC power into DC power also have significant energy loss due to the conversion efficiency.

A technology that could provide DC power in most places, so that people have easy access to the DC powers for their electronic devices without the need to carry any power adapter is desirable. The apparatus and method to make DC power ubiquitous in our environment and to bring convenience to our daily life are disclosed hereafter.

SUMMARY

Most power distribution circuits at homes or buildings receive AC power for majority of electronic devices or appliances. As is well known, an electronic device or appliance is plugged into an AC socket connected to a power distribution circuit to obtain AC power. If DC power can be delivered on an existing AC power distribution circuit to the AC sockets for direct use by the device, then tremendous energy waste could be avoided. One method is to change the power connection to circuit breaker installed in power panel from AC to DC. Another method is to provide DC power directly from regenerated DC energy sources, such as solar panels. Such DC power delivery would obviate the need for an AC power adaptor to convert the AC power into DC for electronic devices.

In accordance with one aspect of the present invention, a DC power attachment device provides a solution to bridge the gap in using DC powers on an AC socket. A DC power attachment device re-configures the DC power delivered to an AC socket and makes the DC power present on the DC connectors readily available for a variety of DC devices.

The DC power attachment is different from a passive AC adaptor. The internal structure of a legacy AC adaptor is a simple, direct wiring from an input prong connected to AC socket to a corresponding output slot for an external device to access power in a one-to-one connection. An AC device must be connected to two or three output slots on an AC adaptor to obtain AC power. A DC power attachment device, however, takes the DC power and ground inputs from the interface prongs on the attachment device and re-configures them on an output connector for a DC device to plug into.

As the connection of power input to circuit breaker installed in power panel to AC power or to DC power determines the set of electrical wirings in a power distribution circuit to become either an AC power distribution circuit or a DC power distribution circuit, the transition of power delivery from AC to DC is feasible. The circuit breaker for AC power distribution and for DC power distribution may have different safety requirements.

A DC power attachment device, in accordance with one embodiment of the present invention, is a device for adapting DC powers. It provides a convenient solution to supply DC power. A DC power attachment device can be plugged into an AC socket, or it can be mounted on a supporting structure, such as wall. A DC power attachment device can be directly wired to the conduction wires of a power distribution circuit so as to become a fixed DC socket connected to a DC power distribution circuit as well.

In the US, a power distribution circuit for AC power delivery in a building includes at least three wires, i.e. a phase wire, a neutral and a ground for 120V AC distribution. Sometimes more than 3 wires are included in a power distribution circuit. For example, a 240V AC power distribution circuit in the US has 4 wires.

In AC power distribution, the ground wire is for shock protection, i.e. a safety feature, and normally carries no current. It may be excluded in some AC power distribution circuit. However, the ground wire in DC power distribution circuit is an essential wire and is a current return path for the DC power. Besides ground wire, all hot wires in an AC power distribution circuit could be leveraged to deliver one or more DC powers to an AC socket. That is one or more DC powers could be delivered on the power interconnects of an existing AC power distribution circuit to sockets connected to the distribution circuit. Since the one or more DC powers share the same ground wire as common current return path, a larger ground conductor in a DC power distribution circuit would be helpful for DC power delivery.

There are many unique features and advantages for the DC power attachment device. It enables a multitude of DC devices to concurrently access multiple DC powers of the same or different DC voltages on a single power attachment device connected to an AC socket. It supports a variety of DC connectors on a single power attachment device and includes safety features. The DC power attachment device can also be directly connected to a DC power distribution circuit.

DETAIL DESCRIPTION

DC power (alternatively referred to herein as DC) distribution has many advantages. It is safer than AC power (alternatively referred to herein as AC). The same electrical cables/wires could carry more DC current than AC. DC power does not need an AC-to-DC adaptor for hand-held device or laptop computer to convert AC into DC. Less energy is dissipated in DC power transfer as DC current does not bear impedance loss. In an AC dominant environment, green DC power, for example, generated by solar panels, is often inverted into AC to integrate into AC power grid and then converted back to DC for home or office use, which is insufficient in energy usage as much energy is wasted in the conversion process.

Figure 1:
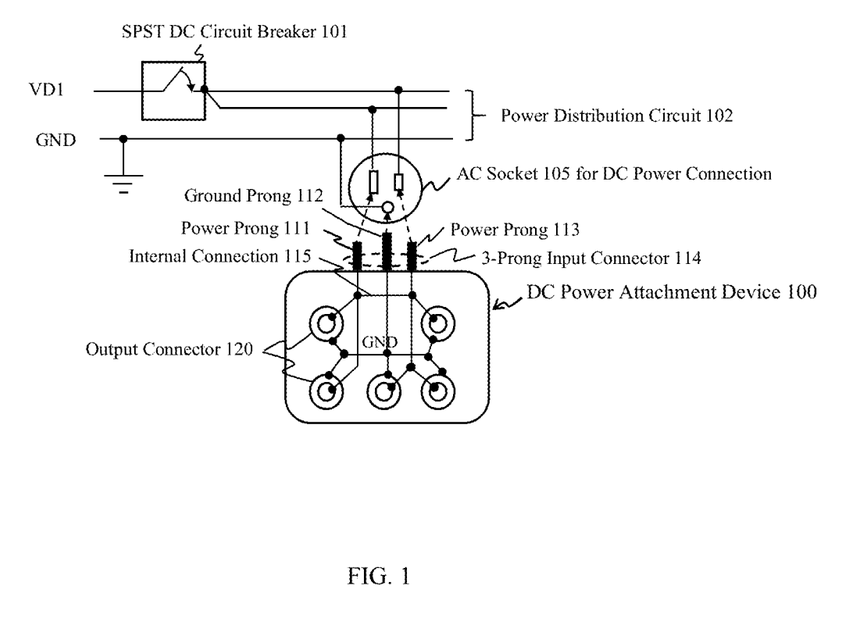
FIG. 1 shows a DC power attachment device with a 3-prong input connector for coupling to an AC socket for single DC power adaptation, in accordance with one exemplary embodiment of the present invention.

In accordance with one embodiment of the present invention, a DC power attachment device is adapted to deliver DC power from a power distribution circuit. FIG. 1 illustrates a DC power attachment device (alternatively referred to herein as a DC power attachment, or a DC attachment) 100, for single DC power adaptation, in accordance with one embodiment of the present invention. DC power attachment 100 as shown includes two power input prongs 111, 113 and a ground prong 112. The three prongs 111, 112, 113 form a 3-prong input connector 114 adapted to be plugged into an AC socket 105. AC socket 105 is shown as being connected to a power distribution circuit 102 used for AC power distribution. The two hot wires of the AC power distribution circuit 102 are shown as being connected to the output of a single-pole, single strobe (SPST) circuit breaker 101 to deliver DC power to the distribution circuit 102. Other type of circuit breaker or power selector may be connected to the power panel, which are not shown. There may be one or more sets of DC output connectors 120 on the attachment device 100. Each output connector 120 takes a DC power input from one of power-prongs 111, 113 and the ground input from ground prong 112 to form an output connector to power a DC device.

The two inputs from power prongs 111, 113 may be connected together in the DC power attachment 100, such as the wire 115 shown, so that each output connector 120 has input connection to both power prongs 111, 113. Alternatively, the two power prongs 111, 113 may not be connected together internally in the attachment device 100, i.e. no internal connection wire 115, so that each power prong 111, 113 provide DC power to a subset of output connectors, thereby to form two subsets of DC connectors.

A DC power attachment 100 may provide a multitude of output connections for more DC devices to access DC power on a single AC socket. A DC power connector is normally more compact in physical size than an AC power connector. Also, there is no AC-to-DC converter in the DC power attachment and less heat dissipation, as is commonly present in an AC power adaptor. Thus, it is a cool device and more DC connectors can be placed along the outer surface of a DC power attachment device.

Furthermore, the configuration of input prongs of a DC power attachment device 100 could be rearranged to match the geometry and configuration of various AC sockets used in different regions or countries to eliminate the inconvenience of carrying one or more bulky AC connection adaptors. Travelers would then only need to carry one or a few DC power cables, one for each type of electronic devices to access DC power.

In one embodiment, the output connectors of a DC power attachment device may be standard DC connectors, such as USB 2.1, micro-USB or USB type-C connectors. In another embodiment, one or more standard DC connectors and/or customized DC connectors may be placed on the surface of a DC power attachment device to provide convenience in accessing DC power or to meet the applications requirement. The three-prong input connector 114 in FIG. 1 is only an example of input interface in a DC power attachment device 100. For a two-wire DC power distribution circuit, or for a four-wire power distribution circuit, the configuration of input connector may be changed accordingly. Moreover, the inputs to a DC power attachment device may be directly connected to the power and ground interconnects in a power distribution circuit so as to have the power attachment device directly mounted on the wall in order to become a fixed DC power socket.

Figure 2:
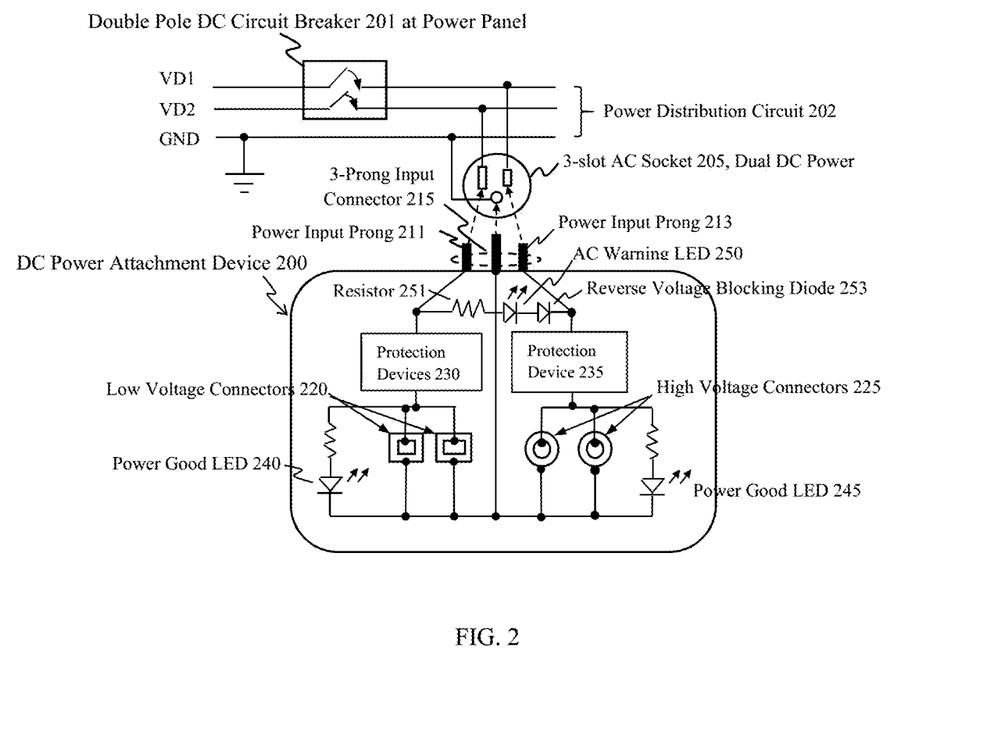
FIG. 2 shows a DC power attachment device with a 3-prong input connector for coupling to an AC socket for dual DC power adaptation, in accordance with one exemplary embodiment of the present invention.

FIG. 2 shows an exemplary DC power attachment device 200 having a 3-prong input connector 215 at its power interface to couple to an AC socket 205 for dual DC power adaptation. A 120V AC power distribution circuit in the US includes three wires, i.e. a phase wire, a neutral and a ground. In one embodiment, two different DC power (alternatively referred to herein as voltages) may be delivered over the phase wire and neutral on such an existing AC power distribution circuit. The two DC voltages may be at same or have different values. By including two sets of output connectors 220, 225 in the DC power attachment device 200, two types of DC devices, or devices with different power connectors, would be able to access the required DC voltages from a single attachment device 200 that is plugged into an existing AC socket. The dual DC powers delivered to a DC power attachment device take advantages of two power wires in an existing 120V AC power distribution circuit in the US.

The DC power attachment device 200 in FIG. 2 is shown as including two DC power protection devices 230, 235 and shown as being connected to power input prongs 211, 213 of a 3-prong input connector 215. There is a separate ground prong at the input connector 215, which may or may not be connected to the protection devices 230, 235, but is connected to the sets of output connectors 220, 225 to function as the current return path for DC devices connected to the connectors. If power prong 211 is assumed to carry a low DC voltage and the power prong 213 is assumed to carry a high DC voltage in FIG. 2, then the protection device 230 is coupled to the low-voltage power prong 211 and the protection device 235 is coupled to the high-voltage power prong 213. Depending upon the voltage and current ratings of electronic devices connected to output connectors 220, 225, the protection devices 230, 235 may have different electrical characteristics.

The protection device may be mechanical protection devices or solid-state integrated circuits devices, or a combination of the two, based on the applications requirements. The mechanical protection device may occupy more space in a power attachment device than the solid-state protection counterpart. But the voltage drop across a mechanical protection device is often less than that of a solid-state device and thus may consume less power in detecting power abnormality for the DC devices connected to a DC power attachment device.

As an example, the mechanical protection device may include a thermal bimetal strip for overload protection, an electro-magnetic coil for short circuit protection, and an arc chute for arc protection. No ground connection is required for such a mechanical protection device. Since a DC voltage is constant and does not change, the plugging and unplugging of devices from output connectors on a DC power attachment may generate arc, particularly at the high DC voltage connector. Thus, an arc protection device at times may be useful to minimize electrical disturbance in a power distribution circuit when multiple DC devices are connected to the distribution circuit.

The solid-state protection device may include, in part, several safety features, such as (i) short circuit protection for DC devices connected on the output connectors, (ii) overload protection to ensure total currents drawn by DC devices on a DC power attachment device not to exceed certain limit, (iii) mitigating inrush current during the insertion of a high capacitive DC device into an output connector, and the like. Shock protection may not be necessary in a DC power attachment device as a thin insulation layer is sufficient to prevent DC current from flowing through human body. A mechanical protection device may require manual reset or turn-on after switch off, while a solid-state protection device may automatically recover from power abnormality.

Two types of output connectors 220, 225 are illustrated in the example of FIG. 2, where one type of DC connector is formed by taking the low DC voltage output from the protection device 230, and the ground input from the 3-prong input connector 215 to form a multitude of low DC voltage connectors 220 for low voltage DC devices, such as hand-held or mobile devices to connect. The other type of output connector is formed by taking the high DC voltage output from the protection device 235 and the ground input from the 3-prong input connector 215 to form a multitude of high voltage output connectors 225 adapted to provide higher DC voltage. In the example of FIG. 2, the phase slot in AC socket 205 is assumed to carry a higher DC voltage.

The DC power attachment is different from an AC connection adaptor. On an AC connection adaptor, it internally includes a one-to-one direct wiring from an input prong to an output slot. An AC device must connect to the same two or three connector slots on the adaptor similar to the connection on an AC socket to obtain AC power. The two hot slots on an AC connection adaptor form an AC power loop when an AC device is plugged into it. If any hot wire is disconnected, no AC power is provided.

In a DC power attachment device, DC power from a power input prong is coupled to a power contact of output connector and ground input from ground prong is coupled to a ground contact at the same connector. The two inputs taken from the 3-prong input connector 215 form a single output connector. A current loop is formed at each output connector when a DC device is plugged in. In case any of the inputs to a DC power attachment device is disconnected, the other input may still be available to power DC devices, depending upon the configuration of circuit breaker 201 and the output connection to the power distribution circuit. For example, if a double-pole circuit breaker 201 is installed in power panel with individual control for each pole, then the inputs connected to the high DC voltage output connector and the low DC voltage connectors may be controlled independently. In case any of the two is disconnected, the other one is still able to supply power to the DC power attachment device 200.

Optional LEDs may be included in the DC power attachment device to indicate power availability. For example, a "power good" LED 240 may be connected in parallel with the low voltage output connectors 220 to indicate the power availability of the low DC voltage. A resistor may be used to limit the current through LED for brightness control. Similarly, a "power good" LED 245 may be used to indicate the power availability at high DC voltage connectors 225.

An optional AC warning LED 250 may be included in the DC power attachment device 220 to warn about accidental plugging of a DC power attachment device into an AC socket with AC power on it. A resistor 251 larger than, e.g., 10KΩ in series with AC warning LED 250 may substantially limit an accidental AC current through it. A reverse-biased blocking diode 253 may also be included in the same direction as the warning LED 250 with its cathode connected to the higher DC voltage side. In normal DC condition, no current flows through the AC warning LED 250 except trivial leakage current thereby no impact on the functionalities of DC power attachment device 200.

The DC power attachment device 200 may be adapted to supply a single DC power if the double-pole circuit breaker 201 is replaced by a single-pole circuit breaker 101 (as was shown in FIG. 1) and the output of single-pole circuit breaker 101 is connected to the two hot wires of a power distribution circuit to deliver the same DC voltage to both sets of output connectors.

Figure 3:
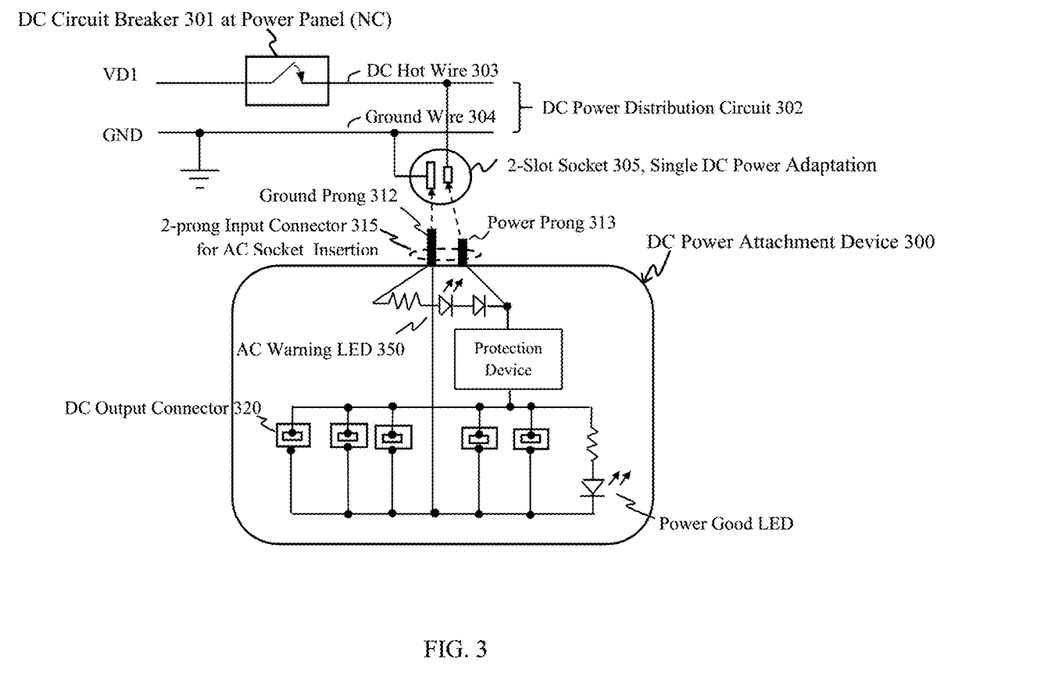
FIG. 3 shows a DC power attachment device with a 2-prong input connector for coupling to a 2-slot AC socket for single DC power adaptation, in accordance with one exemplary embodiment of the present invention.

FIG. 3 shows an example of a DC power attachment device 300 adapted to supply a single DC voltage. A SPST circuit breaker 301 at a power panel controls the VD1 power delivery to a DC power distribution circuit 302, which includes a DC hot wire 303 and a ground wire 304. In some countries, a two-wire AC power distribution circuit is still common. In the example, a power socket comprising two slots is coupled to the power distribution circuit 302. The DC power attachment device 300 includes a 2-prong connector at its input interface (i.e. a power prong 313 and a ground prong 312) where the power prong 313 is coupled to a protection device 330. The output from protection device 330 is shown as being connected to the power contacts of output connectors 320. The ground input from ground prong 312 is connected to the ground contacts of output connectors 320. The DC power attachment device 300 in FIG. 3, which may be perceived as a subset of the DC attachment device 200 of FIG. 2, supplies a single DC power with a 2-prong input connector 315.

The DC power attachment device 300 is different from an AC power strip, where an AC device requires to plug into two or more slots on an AC socket at the AC power strip to obtain AC power. It is also different from a power strip including DC USB connectors, where the power strip is connected to the AC power input and employs an internal AC-DC converter to provide DC power for the USB connectors.

Figure 4:
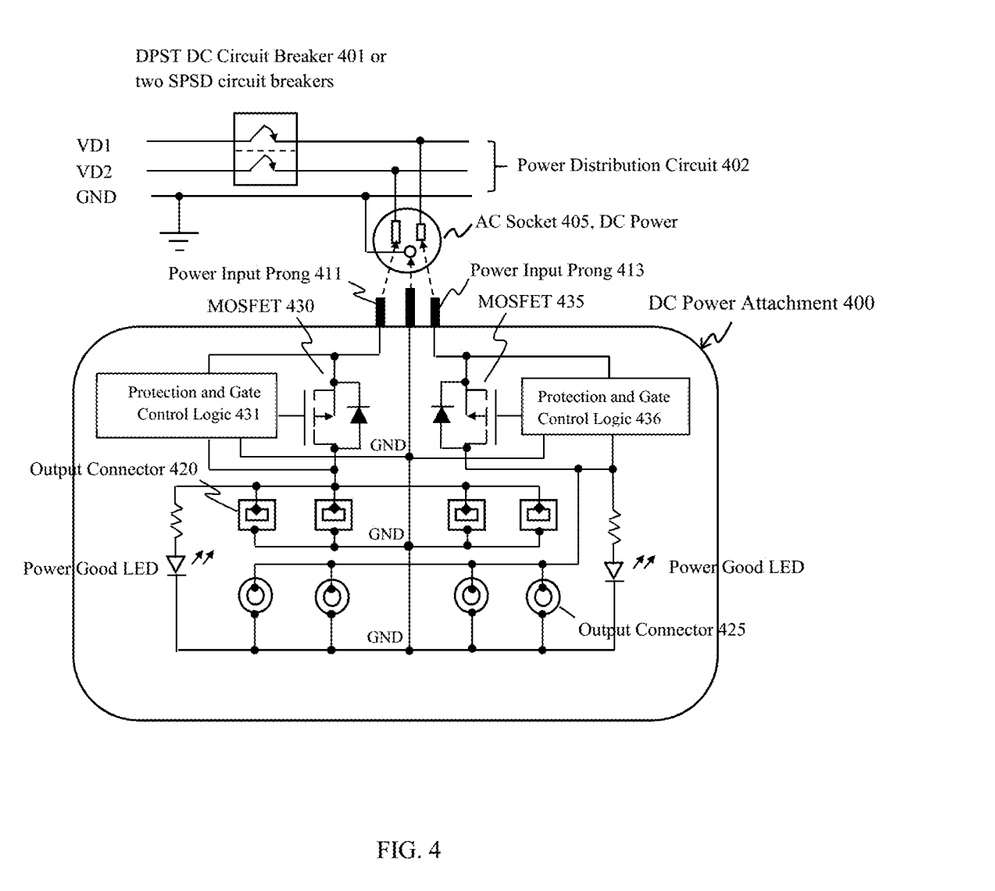
FIG. 4 shows a DC power attachment device with 3-plung input connector for coupling to an AC socket for dual DC power adaptation with MOSFET switch, in accordance with one exemplary embodiment of the present invention.

FIG. 4 shows an example of internal configuration of a DC power attachment device 400 coupled to AC socket 405 to supply dual DC voltages, one being a low DC voltage to power mini-devices, such as, hand-held gadgets or mobile phones, and the other being a higher DC voltage to supply power to devices, such as laptop. Two MOSFET devices 430, 435 control power output to respective output connectors 420, 425. It is understood that MOSFET device, MOSFET switch, and MOSFET transfer gate are used interchangeably in the present application. The two DC voltages, VD1 and VD2, delivered from power distribution circuit 402 to an AC socket 405 are shown as being under the control of a DPST DC circuit breaker 401. Two SPST circuit breakers or a DPST circuit breaker with dual-switch control may be used to replace the DPST circuit breaker 401 of single-switch control to output respective DC power to the power distribution circuit 402.

The MOSFET devices may be N-channel or P-channel MOSFET transistors. The P-channel, enhancement mode MOSFET transistor is used in the example. The MOSFET device 430 is controlled by a protection gate control logic 431, which detects DC power from the power input prong 411 and monitors usage abnormality at output connectors 420. Similarly, the MOSFET device 435 is controlled by a gate control logic 436, which detects DC power from the power input prong 413 and monitors usage abnormality at the output connectors 425. Because the voltages from power input prongs 411, 413 may be different, the voltages or power rating of output connectors 420, 425, the electrical characteristic of MOSFET device 430 and MOSFE device 435, and the implementation of gate control logic 431, 436 may be different. The electronic protection device and gate control logic 431, 436 may require ground connection to function properly.

The configuration of the dual MOSFET devices in the example of FIG. 4 and the configuration of dual protection devices in FIG. 2 of a DC attachment device are both applicable for the single DC power embodiments. For single DC power embodiments, the output connectors in a DC power attachment device may deliver the same DC voltage but with different connector types. In single DC power embodiments, the DC power input from two power prongs 411, 413 connected to a 3-slot AC socket may be connected together internally or may be connected separately in the attachment device. The former forms a single set of output connectors and the latter forms two sets of output connectors and has an advantage. If, for example, the MOSFET device 430 and its gate control logic 431 in FIG. 4, or the protective device 230 in FIG. 2 detects any power abnormality at its output connectors, the MOSFET device 430 or the protection device 230 could automatically switch off to disconnect power to its respective set of connectors without disturbing devices connected to the other set of output connectors.

Figure 5:
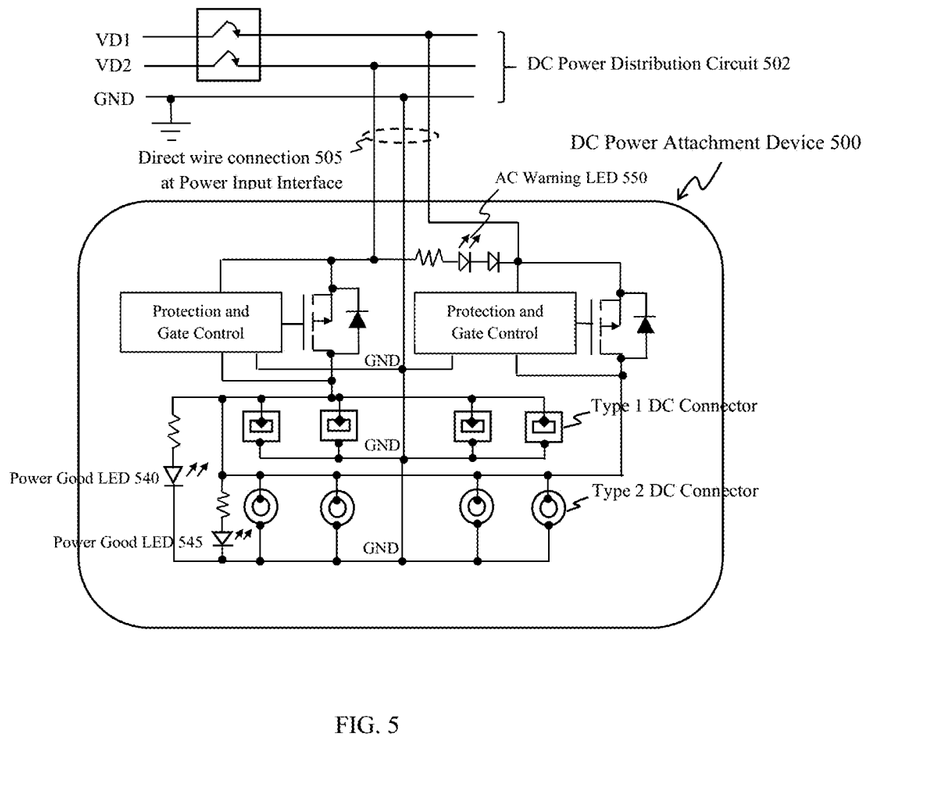
FIG. 5 shows a DC power attachment device suitable for single or dual DC power adaptation with MOSFET switch and direct wiring to a power distribution circuit, in accordance with one exemplary embodiment of the present invention.

FIG. 5 is an example of a DC power attachment device 500, in accordance with another embodiment of the present invention. DC power attachment device 500 is similar to DC power attachment device 400 shown in FIG. 4, except that the DC power attachment device 500 includes a set of direct wire connections 505 at its power input interface for coupling to power distribution circuit 502. The power distribution circuit 502 may be a new construction circuit, or it may be an existing AC power distribution circuit but without AC sockets at the connection frame while using direct wiring to supply DC power to the DC power attachment device 500. The number of wires in a DC power distribution circuit 502 or at the power input interface 505, and the number of MOSFET devices and the associated protection and gate controls may be determined by the requirement of applications. The DC power attachment device 500 using a direct wiring interface may be directly mounted on a supporting structure, such as a wall or chassis. Optional AC warning LED 550 and power good LEDs 540, 545 may be included to indicate any improper insertion and the availability of DC powers at respective output connectors as illustrated in the example.

Figure 6:
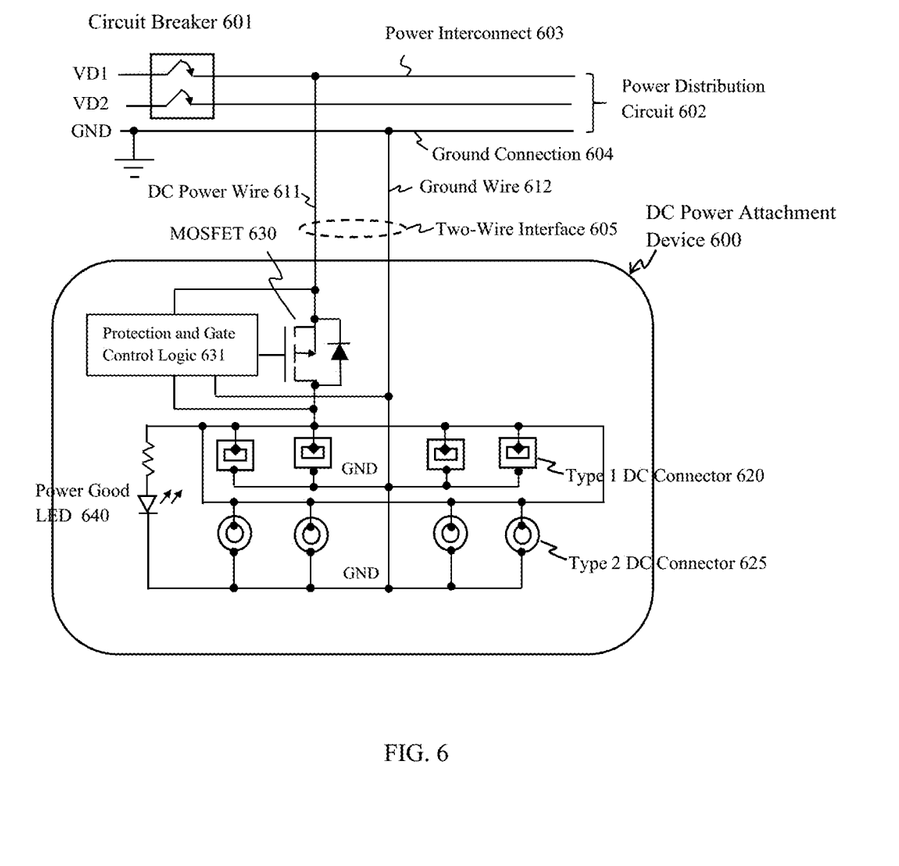
FIG. 6 shows a DC power attachment device for single DC power adaptation with MOSFET switch and direct wire connection to a power distribution circuit, in accordance with one exemplary embodiment of the present invention.

FIG. 6 is a DC power attachment device 600, in accordance with another embodiment of the present invention. DC attachment 600 includes a MOSFET transistor 630, controlled by protection and gate control logic 631. Its input includes a two-wire interface 605 that, in turn, includes a DC power wire 611 and a ground wire 612. The ground wire 612 is directly connected to the ground connection 604 and DC power wire 611 is connected to a power interconnect 603 (it is understood that there may be a set of power interconnects in the power distribution circuit 602) controlled by circuit breaker 601 disposed in power panel.

In the example shown in FIG. 6, a P-Channel, enhancement mode device is chosen for MOSFET transistor 630. The source of MOSFET transistor 630 and the protection and gate control logic 631 are connected to power input wire 611, where the gate control logic 631 may include a voltage detector to monitor the voltage level at DC power input to control the turn-on of MOSFET transistor 630 when the DC voltage input reaches a set value. The output of DC attachment device 600 is shown as including two types of output connectors 620, 625. For example, one type may be a USB 2.1 connector and the other may be a micro-USB connector. The protection and gate control logic 631 may also monitor the status of DC devices plugged on the output connectors 620, 625 for power overload, short circuit or other abnormalities. A power good LED indicates the availability of DC power. The protection and gate control logic 631 obtains its power from the input power wire 611 to control the switching of MOSFET transistor 630.

Figure 7:
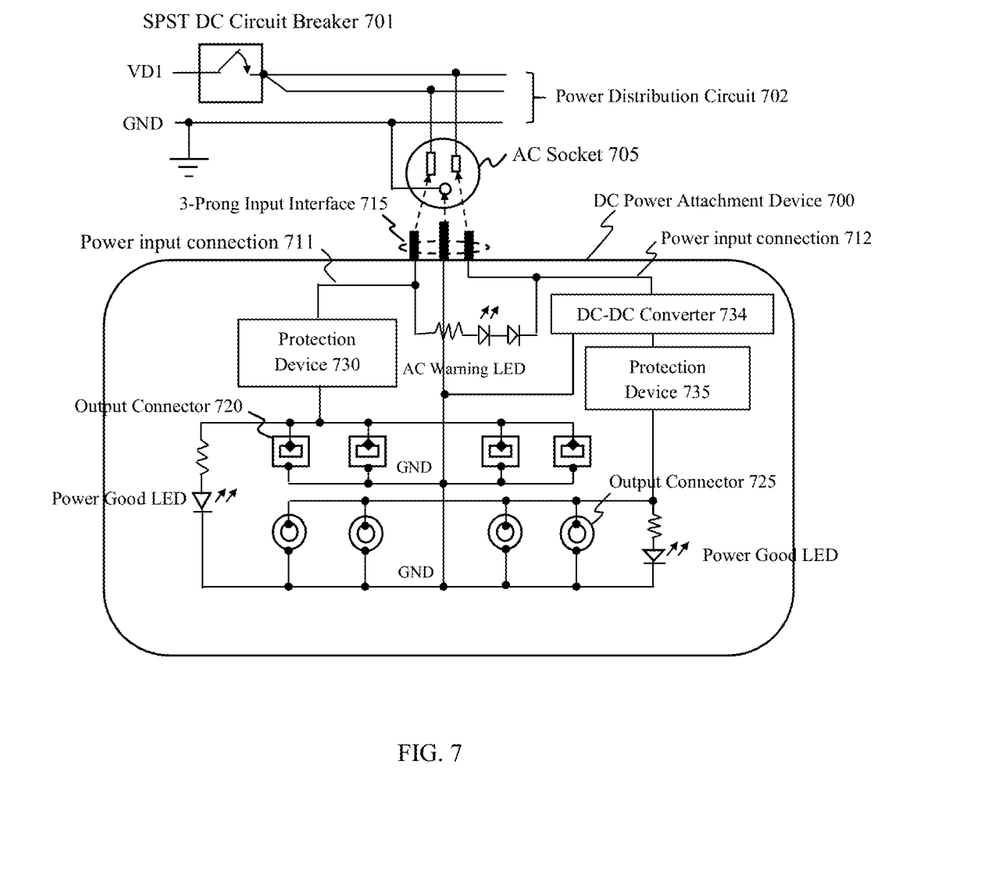
FIG. 7 shows a DC power attachment device including a DC-DC converter for multiple DC power adaptation, in accordance with one exemplary embodiment of the present invention.

FIG. 7 shows another exemplary embodiment of a DC power attachment device including DC-DC converter for adjusting input voltage at output connectors. In the example of FIG. 7, the DC attachment device 700 is shown as including a 3-prong input interface 715 coupled to an AC socket 705, which in turn, is connected to a three-wire power distribution circuit 702, shown as being controlled by a SPST DC circuit breaker 701.

A DC-DC power converter 734 is connected to a power input connection 712 to convert the DC input VD1 to one or more DC voltages to meet the voltage requirements at output connectors 725. The converted output voltage may be higher or lower than the DC input. In the example, only one DC output voltage is shown, but it is understood that more DC outputs from the DC-DC converter 734 may be generated. Each such output may be further connected to more protection devices. Ground connection is also required and is connected to the DC-DC converter 734 as a reference voltage.

More electronic devices may require lower DC voltages, such as 3.3V, 1.5V, 1.1V or lower to operate. The various DC voltages may be supplied directly from the DC powers sourced at the power panel. For lower voltage, it may be more reliable to use a DC-to-DC converter disposed in the attachment device 700. The protection device 735 is connected to the output of DC-DC converter 434 and monitors power abnormality for devices connected to output connectors 725. As for the protection device 730, it supplies DC power from other power input connection 711 to pass to its outputs, and monitors devices connected to the output connectors 720. The protection devices 730, 735 may be interchangeable with MOSFET switches and associated gate control logic to protect devices connected to output connectors. Depending upon the type of protection devices, the ground connection may or may not be connected to the protection devices.

In the example of FIG. 7, the three-prong input interface may be changed to three individual wires, or the power distribution circuit 702 may be connected to a DPST circuit breaker with two-throw output connected to two hot wires in the power distribution circuit 702. It is understood that many other variations may exist in the internal configuration of an attachment device, the power distribution circuit, the power input interface connection, and the output connectors of a DC power attachment device, all of which fall within various embodiments of the present invention.

For example, the DC power attachment may be a standalone device for direct coupling to a DC power source, such as to the output of solar panel or to a set of battery banks so as to supply external DC devices with one or more DC powers. It is also understood that the exemplary embodiments described and shown herein only illustrate some of the variations.

Figure 8A:
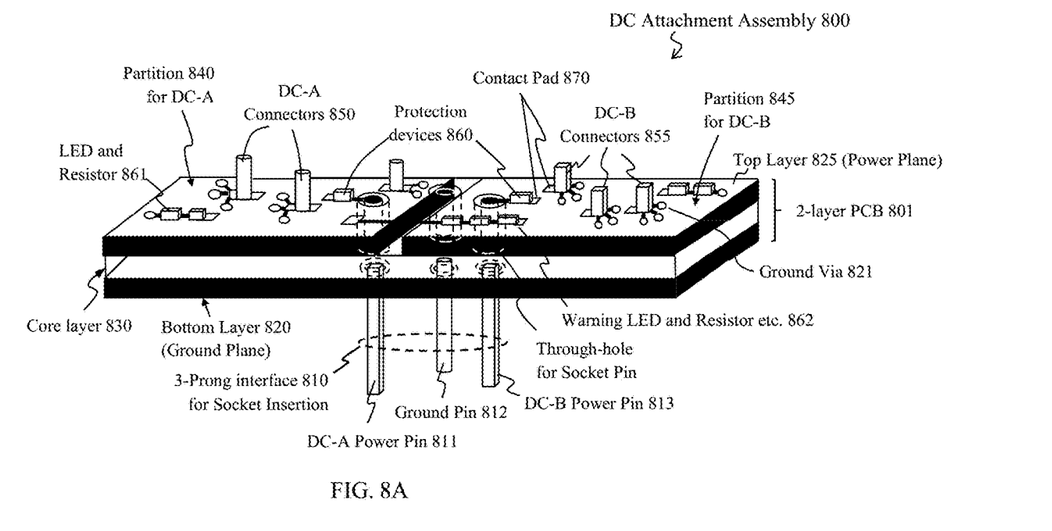
FIG. 8A shows a DC power attachment assembly having a 3-prong input connector and vertically mounted output connectors on a PCB substrate, in accordance with one exemplary embodiment of the present invention.

FIG. 8A is a perspective view of an embodiment of the DC power attachment device 800 and its assembly. A printed circuit board (PCB) is selected for the assembly, where components such as LEDs and resistors 861,862, capacitors, protection devices 860 and various DC connectors 850, 855 are soldered or surface-mounted on the top and bottom surfaces of a PCB. Typically, a two-layer PCB 801 is sufficient for the assembly of a DC power attachment device 800 but more layers may be used, if necessary. In FIG. 8A, a two-layer PCB 801 is selected for the DC attachment assembly, where the bottom layer 820 of PCB 801 is selected as a ground plane with connection to ground pin 812, and the top layer 825 of PCB 801 is selected as a power plane, which may be divided into one or more power partitions, depending upon the number of power inputs to the DC power attachment device 800. It is a design discretion to select which layer as power or ground plane. Copper pour may be applied over each partition of power and ground for better power and ground connections and better EMI shielding.

In the example, three-prong interface 810 is selected to illustrate the assembly of a DC power attachment device 800. The three interface prongs, i.e. DC-A power pin 811, ground pin 812, and DC-B power pin 813, are inserted and soldered at three through-holes on PCB 801 to increase mechanical rigidity during plugging and unplugging of the attachment device at socket.

There are two power partitions 840, 845 at the top layer 825 of PCB 801. Two power prongs, i.e. DC power pin-A 811 and DC power pin-B 813, are soldered and connected to power partitions 840, 845 respectively to receive DC-A and DC-B power inputs from a distribution circuit. A core layer 830 is pressed and sandwiched between the top layer 825 and the bottom layer 820 of PCB 801, to provide insulation between the top layer and the bottom layer and to provide a solid support holding the 2-layer PCB together. A multitude of ground vias 821 bring ground connection from the bottom layer 820 to the ground pads fabricated at the top layer 825 for passive components, protection devices and output connectors, and the like, to connect.

Figure 8B:
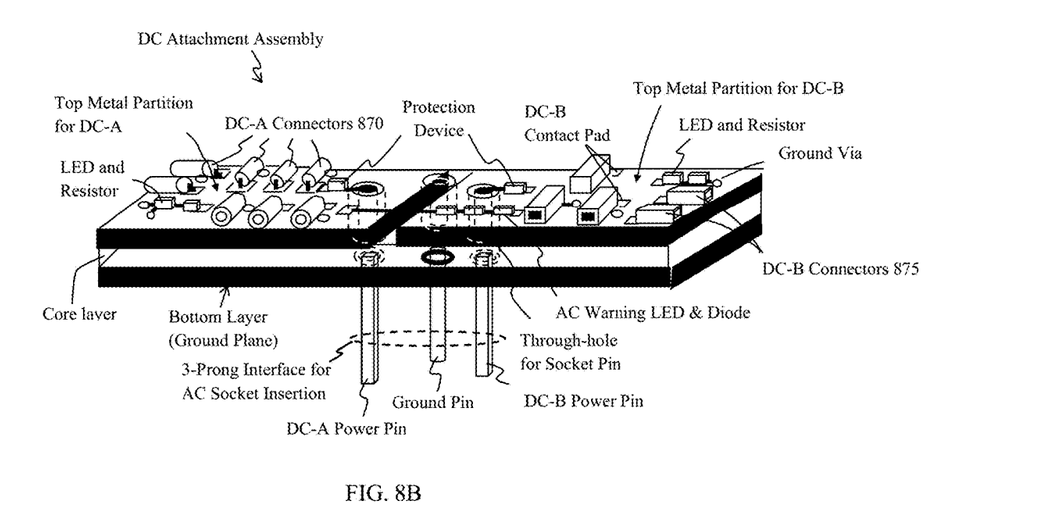
FIG. 8B shows a DC power attachment assembly having a 3-prong input connector and horizontally mounted output connectors on a PCB substrate, in accordance with one exemplary embodiment of the present invention.

In FIG. 8A, the DC-A, DC-B power connectors 850, 855 are mounted vertically, and in FIG. 8B, the DC-A, DC-B power connectors 870, 875 are mounted horizontally. Using vertically mounted connectors, it could increase the number of connectors on the assembly of a DC attachment device 800, as a vertically mounted DC connector normally occupies smaller footprint on PCB surface. Using horizontally mounted connectors, results in a thinner power attachment device, which is desirable for areas that have space constraints.

The DC-A connectors 850 and DC-B connectors 855 may be of different types to accommodate different DC devices. If the heights of connectors are different, one type of connectors may be soldered horizontally and the other type may be soldered vertically, depending upon the housing design of the assembly. If the connectors are installed in a vertical orientation, they are soldered on the top surface of PCB 801 with their respective power and ground contact pads 870 being placed on the top surface in most cases. Either surface-mount connector or through-hole connector can be used as output connector in the assembly of a power attachment device. If connectors are installed in a horizontal orientation, then the connectors may be soldered on both top and bottom surfaces of PCB 801, although having all output connectors soldered on the same top surface may simplify the manufacturing process. Some supporting devices, such as protection device 860, may be placed at the bottom surface of PCB 801 to share area on ground plane, but LEDs shall be placed on the top surface at locations readily visible externally.

It is understood that FIGS. 8A and 8B are simply for illustration purpose and that there may be variations in the DC power attachment assembly. For example, the DC-A, DC-B power pins 811, 813 and ground pin 812 at the 3-prong interface 810 may be a round pin or a square pin. When the DC power attachment provides a single DC supply, the number of pins of a 3-pront interface 810 on a DC attachment assembly may be changed to match a 2-prong interface with the top metal partitions 840, 845 merged into a single partition carrying the same DC voltage.

Figure 9:
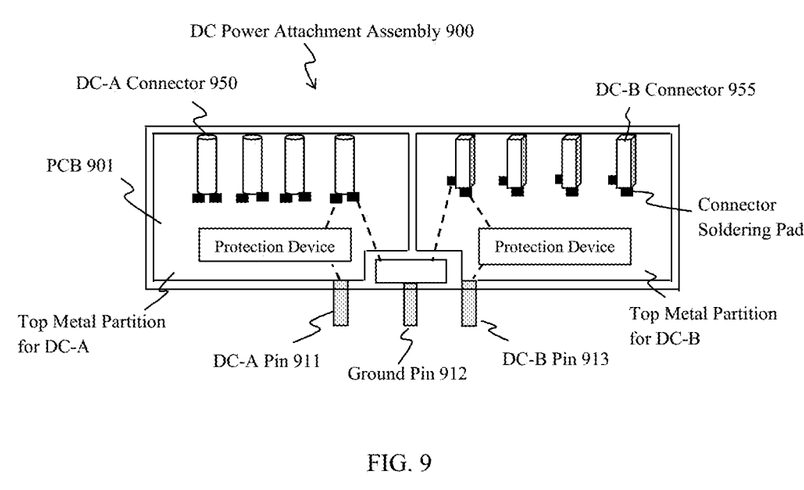
FIG. 9 shows a DC power attachment assembly using PCB as substrate with input edge connectors and horizontally mounted output connectors for dual DC power adaptation, in accordance with one exemplary embodiment of the present invention.

FIG. 9 shows a DC power attachment assembly 900, in accordance with another exemplary embodiment of the present invention. In embodiment 900, the three interface pins, i.e. DC-A pin 911, ground pin 912, and DC-B pin 913, are soldered along one edge of PCB 901, and the output connectors, i.e. DC-A connector 950 and DC-B connector 955, are soldered and aligned at the other edge with connector openings accessible for externally. The output connectors may be surface-mounted or soldered perpendicularly to the surface of PCB 901 with the three-prong interface pins 911, 912, 913 being mounted in parallel with the PCB surface.

The manufacturing of a DC power attachment assembly using a PCB avoids intertwined connection wirings and provides a sturdy mechanical support for connectors assembled on the attachment device. A housing may be applied to enclose the DC power attachment assembly, where up to 5 external surfaces are available for installing output connectors and bottom surface for the power socket connection.

As described above, DC power attachment device adapted to provide DC voltages for one or more devices, in accordance with embodiments of the present invention, is flexible, convenient and user-friendly. The DC power attachment device works seamlessly with connector technology transition. For example, if a USB type-C connector or another new connector becomes the mainstream power connector to phase out the older one, then the inclusion of the new type of output connectors on a power attachment device, along with the existing connectors, could support the entire connector family for many users. Multiple output connectors on an DC power attachment enable more DC devices to access DC power. Both high-voltage power intensity devices and low-voltage DC devices could be plugged into a DC power attachment device to receive DC powers concurrently from an existing power socket location. The DC attachment device bridges the gap to bring DC to homes, offices, and buildings by leveraging the existing, well established AC power infrastructure.

What is claimed:

1. An apparatus for adapting a DC voltage, the apparatus comprising:
   an interface adapted to couple to an AC socket, said AC socket coupled to a DC power distribution circuit, the interface comprising:
      a power input connector coupled to a power interconnect disposed in the DC power distribution circuit and adapted to supply the DC voltage, and
      a ground connector coupled to a ground interconnect disposed in the DC power distribution circuit;
   a plurality of output connectors, wherein at least one of the output connectors comprises a power terminal coupled to the power input connector and a ground terminal coupled to the ground connector, said at least one output connector supplying the DC voltage; and
   an enclosure comprising a plurality of openings formed on its exterior surface and adapted to receive and connect devices to the plurality of output connectors.

2. The apparatus of claim 1 further comprising a protection device having an input coupled to the power input connector and an output coupled to the plurality of output connectors, said protection device adapted to monitor power abnormality of devices connected to the plurality of output connectors.

3. The apparatus of claim 2 wherein the protection device is mechanical protection device comprising at least one of thermal bimetal strip for overload protection, electro-magnetic coil for short circuit protection, and arc chute for arc protection.

4. The apparatus of claim 2 wherein the protection device is an electronic protection device comprising a MOSFET transfer gate being controlled by a gate control logic adapted to monitor the DC power at the power input connector, and further to monitor devices connected to the plurality of output connectors, wherein the gate control logic is adapted to:
   switch the MOSFET transfer gate on to transfer the DC voltage to the plurality of output connectors when a voltage at the power input connector reaches a predefined voltage, and
   switch the MOSFET transfer gate off when detecting power abnormality on devices connected to the plurality of output connectors.

5. The apparatus of claim 1 further comprising a DC-DC converter having an input coupled to the power input connector and an output coupled to the plurality of output connectors.

6. The apparatus of claim 1 further comprising a DC-DC converter having an input coupled to the power input connector and an output coupled to a protection device, wherein the protection device is adapted to deliver the converted output from the DC-DC converter to the plurality of output connectors and further adapted to monitor power abnormality at devices connected to the plurality of output connectors.

7. The apparatus of claim 1, further comprising a DC-DC converter having an input coupled to the power input connector and an output coupled to a MOSFET transfer gate controlled by a gate control logic to control transfer of converted voltage from the DC-DC converter to the plurality of output connectors, and further to monitor power abnormality at devices connected to the plurality of output connectors.

8. The apparatus of claim 1, further comprising a light emitting diode (LED) and a resistor coupled in series with the LED adapted to indicate availability of the DC power.

9. The apparatus of claim 1 wherein the interface comprises a plurality of wires directly connected to the DC power distribution circuit.

10. The apparatus of claim 1 wherein a first subset of the plurality of output connectors are defined by a first type of connector different than a second type of connector defining a second subset of the plurality of output connectors.

11. An apparatus configured to receive a ground input and to adapt a plurality of DC voltages from a DC power distribution circuit, the apparatus comprising:
   an interface adapted to couple to the DC power distribution circuit, wherein the interface comprises
      a first power connector coupled to a first DC voltage of the plurality of DC voltages;
      a second power connector coupled to a second DC voltage of the plurality of DC voltages; and
      a ground connector coupled to the ground input of the DC power distribution circuit;
   a plurality of output connectors, wherein
      a first subset of the plurality of output connectors comprises power contacts coupled to the first power connector and ground contacts coupled to the ground connector to supply the first DC voltage; and
      a second subset of the plurality of output connectors comprises power contacts coupled to the second power connector and ground contacts coupled to the ground connector to supply the second DC voltage; and
   an enclosure comprising a plurality of connector openings adapted to receive and supply the first and second DC voltages to a plurality of external devices.

12. The apparatus of claim 11 wherein the first power connector and the second power connector supply a same DC voltage.

13. The apparatus of claim 11 wherein the first power connector and the second power connector supply different DC voltages.

14. The apparatus of claim 11 further comprising:
   a first protection device having input coupled to the first power connector and output coupled to the first subset of the plurality of output connectors to power and to monitor power abnormality of devices connected to the first subset of the plurality of output connectors; and
   a second protection device having input coupled to the second power connector and output coupled to the second subset of the plurality of output connectors to power and to monitor power abnormality of devices connected to the second subset of the plurality of output connectors.

15. The apparatus of claim 14 wherein said first and second protection devices have similar protection characteristics.

16. The apparatus of claim 14 wherein said first and second protection devices have different protection characteristics.

17. The apparatus of claim 11 wherein
the first power connector is coupled to a DC-DC converter adapted to convert the first DC voltage to one or more converted voltages, wherein the one or more converted voltages further adapted to deliver to a first subset of the plurality of output connectors.

18. The apparatus of claim 11 wherein the first power connector is coupled to a DC-DC converter being adapted to convert the first DC voltage to a converted voltage; said apparatus further comprising:
a protection device adapted to supply the converted voltage to the first subset of the plurality of output connectors and to monitor devices connected to the first subset of the plurality of output connectors for power abnormalities.

19. The apparatus of claim 11 wherein the first and second power connectors are respectively connected to first and second MOSFET transfer gates being controlled by a first and second gate control logic respectively to control transfer of the first and second DC voltages to a first and second subsets of the plurality of output connectors, wherein said first MOSFET transfer gate is adapted to monitor power abnormality on the first plurality of output connectors and said second MOSFET transfer gate is adapted to monitor power abnormality on the second plurality of output connectors.

20. The apparatus of claim 11 wherein said first and second power connectors are coupled to an AC socket, wherein the apparatus further comprises an LED coupled in series with a resistor, wherein the LED is reverse-bias by the first and second power connectors to warn of erroneous connection to the AC socket.

21. A method of forming a power attachment device, the method comprising:
providing a PCB, the PCB comprising:
a first layer being partitioned into one or more regions for coupling to one or more DC powers delivered to the power attachment device,
a second layer forming a ground plane, and
a plurality of through-holes to hold a plurality of interface pins adapted to be coupled to a power distribution circuit, wherein a ground pin of the plurality of interface pins is soldered in a first one of the plurality of through-holes to couple to the second layer and to a ground interconnect in the power distribution circuit, and wherein a first power pin of the plurality of interface pins is soldered in a second one of the plurality of through-holes and adapted to couple to the one or more regions on the first layer;
mounting a plurality of output connectors on the PCB for supplying a plurality of DC voltages for external devices; and
providing an enclosure having openings for external devices to plug into.

22. The method of claim 21 wherein a second power pin of the plurality of interface pins is soldered in a third one of the plurality of through-holes and adapted to couple to the one or more regions on the first layer.

23. The method of claim 21 wherein the plurality of output connectors are mounted vertically on a top surface of the PCB.

24. The method of claim 21 whereon the plurality of output connectors are mounted horizontally on a surface of the PCB.

25. The method of claim 23 wherein a first subset of the plurality of output connectors are mounted horizontally on a surface of the PCB and a second subset of the plurality of output connectors are mounted vertically on the surface of the PCB.

* * * * *